US008782091B2

(12) United States Patent
Yeh (10) Patent No.: US 8,782,091 B2
(45) Date of Patent: Jul. 15, 2014

(54) METHOD AND SYSTEM FOR ADDRESSING A NODE IN TREE-LIKE DATA STRUCTURE

(75) Inventor: Danny L. Yeh, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 11/511,055

(22) Filed: Aug. 28, 2006

(65) Prior Publication Data

US 2008/0052298 A1 Feb. 28, 2008

(51) Int. Cl.
*G06F 7/00* (2006.01)
*G06F 17/30* (2006.01)

(52) U.S. Cl.
USPC .......................................................... 707/797

(58) Field of Classification Search
USPC .......... 707/3, 4, 100, 102, 797; 709/218, 246; 715/234, 235, 523
See application file for complete search history.

(56) References Cited

U.S. PATENT DOCUMENTS

| 5,557,722 A | 9/1996 | DeRose et al. |
| 5,644,776 A | 7/1997 | DeRose et al. |
| 5,708,806 A | 1/1998 | DeRose et al. |
| 5,893,109 A | 4/1999 | DeRose et al. |
| 5,983,248 A | 11/1999 | DeRose et al. |
| 6,055,544 A | 4/2000 | DeRose et al. |
| 6,101,511 A | 8/2000 | DeRose et al. |
| 6,101,512 A | 8/2000 | DeRose et al. |
| 6,105,044 A | 8/2000 | DeRose et al. |
| 6,167,409 A | 12/2000 | DeRose et al. |
| 6,546,406 B1 | 4/2003 | DeRose et al. |
| 7,028,037 B1 * | 4/2006 | Agarwal et al. ............... 707/100 |
| 7,031,956 B1 * | 4/2006 | Lee et al. ............................. 707/3 |
| 7,086,042 B2 * | 8/2006 | Abe et al. ...................... 717/143 |
| 2003/0020752 A1 * | 1/2003 | Santiago ........................ 345/764 |
| 2003/0101235 A1 * | 5/2003 | Zhang ............................ 709/218 |
| 2003/0182452 A1 * | 9/2003 | Upton ............................ 709/246 |
| 2003/0200502 A1 * | 10/2003 | Abe et al. ...................... 715/500 |
| 2003/0200506 A1 * | 10/2003 | Abe et al. ...................... 715/513 |
| 2005/0050059 A1 * | 3/2005 | Van Der Linden et al. ... 707/100 |
| 2005/0149503 A1 * | 7/2005 | Raghavachari ................... 707/3 |
| 2006/0031763 A1 * | 2/2006 | Yeung ............................ 715/523 |
| 2006/0184551 A1 * | 8/2006 | Tarachandani et al. ....... 707/100 |
| 2007/0208769 A1 * | 9/2007 | Boehm et al. ................. 707/102 |
| 2008/0059404 A1 * | 3/2008 | Jonker et al. ...................... 707/2 |

OTHER PUBLICATIONS

Esposito, Applied XML Programming for Microsoft .NET, Nov. 9, 2002, Chapter 5, 6.*
W3C, DOM Level 2 Core Specification, Nov. 13, 2000, Version 1.0, Entire Specification.*
W3C, DOM Level 3 Core Specification, Apr. 7, 2004, Version 1.0, Entire Specification.*

(Continued)

*Primary Examiner* — Rehana Perveen
*Assistant Examiner* — Huen Wong
(74) *Attorney, Agent, or Firm* — Scully, Scott, Murphy & Presser, P.C.; William Stock, Esq.

(57) ABSTRACT

A system and method for addressing a node in a tree-like data structure evaluates a relative path expression of a node from one or more marker nodes. In one aspect, a single path expression is determined from a nearby marker node. In another aspect, multiple path expression are determined and resolved to a single path expression. In yet another aspect, the method and system of the present disclosure assign unique identifiers to a subset of nodes in the tree data structure.

22 Claims, 4 Drawing Sheets

(56) References Cited

OTHER PUBLICATIONS

W3C, DOM Level 3 Core XPath Specification, Feb. 26, 2004, Version 1.0, Entire Specification.*

Ennser et al., Integrating XML with DB2 XML Extender and DB2 Text Extender, Dec. 2000, IBM, First Edition.*

Srivastava, The Evolution of JAXP, Jul. 6, 2005, XML.com.*

Liu, Markov Model-based Methods for Web User Clustering and Surfing Recommendation, Dec. 2004.*

Xpath—http://www.w3.arg/TR/xpath13. Xpointer—http://www.w3.org/TR/WD-xptr dom4jpackage, www.dom4j.org.

* cited by examiner

METHOD AND SYSTEM FOR ADDRESSING A NODE IN TREE-LIKE DATA STRUCTURE

FIELD OF THE INVENTION

The present disclosure generally relates to information technology and data processing and more particularly to a method and system for determining the location of a node in a tree like data structure for data synchronization.

BACKGROUND OF THE INVENTION

Extensible Markup Language (XML) document has become the data representation format of choice to exchange data between applications or user agents on the Internet. This document is usually wholly or partially read in and parsed by a computer program and stored in memory as a tree of hierarchical nodes with each node holding the data used by the application. This in-memory tree is called a Document Object Model (DOM). The parent-child and sibling relationship between the tree nodes in the XML document is preserved in the DOM. The position of a node in the tree may be as important as the data that the node holds. A node in this tree can be addressed and identified in two ways: by a unique identifier or by a path expression starting from a known node, typically the top root node of the tree. The unique identifier of a node is set by an external agent, e.g., by the application that created the original XML document or the DOM. The path expression does not depend on an external agent; it is a built-in characteristic of the tree-like data structure that by convention a computer program uses to navigate around the tree. An example of the path expression is the fully qualified name of the node, e.g., '/book/chapter[2]' that points to the $2^{nd}$ chapter of a book.

The addressing of a node in a tree-like data structure is important when the tree is being shared among user agents running in a distributed computing environment across a network like the Internet. Client-server use configuration is a common runtime topology where the data is centrally located on the server and with user agents running on client computers that communicate operations on the data to the server. The client computer usually has a full or a partial representation of the data locally cached, either in memory or in persistent storage. XML document and its derivatives such as the HyperText Markup Language (HTML) are commonly used to represent the data that the server sends to a client computer. An example of this topology is a web browser running on a client computer communicating with a web application running on a server. The web server sends a HTML document to the browser, and the browser parses it and creates a DOM tree in memory. This DOM tree contains not only the content but also style and formatting information that tell the browser how to render the document for display. There is a one-to-one mapping between what is being displayed in the browser and the region of sub-tree of the DOM tree. So when user types an input or click within the browser, he or she "interacts" with the nodes of the DOM tree, like updating the content of a node, or creating a new node, or deleting an existing node. In many cases, the browser user agent needs to communicate to the server of these user operations and/or changes to the DOM tree. In order for it to do so, the user agent needs to determine the address of a node whose content is changed and send the address to the server along with changed content. Typically, all nodes of interest have a marker assigned to them. Alternatively, the user agent can generate a fully qualified name, which is a simple form of path expression like XPath, to the node by starting from the node and walk across and up the tree to the root node.

The assignment of unique identifier to a node is done either statically by the designer of the tree data or dynamically as the tree is being created. An example of the former is HTML form found on a web page used to capture user inputs. An example of the latter is the collaborative editing of a XML document, where all editable nodes are dynamically assigned a unique identifier by the server, before it is sent to the client computers. These dynamically generated identifiers are usually not found in the original XML document. They are generated to facilitate the communication of operations on the tree data structure between the client user agents and the server, which has the master copy of the data.

Assigning a unique identifier to all nodes of interests in a tree data structure can be considered wasteful and undesirable under certain circumstances; for example, when the number of nodes is very large in tens and hundreds of thousands and only a very small fraction of the nodes are likely to change by the user agents. In XML, a special attribute name call "Id" is defined to hold this unique identifier, and the DOM API has a special method call getElementById( ) that retrieves the Element node whose attribute "Id" matches the one requested. A common practice in the implementation of DOM is to use a list or a hash map to hold the name-value pair of "Id" name and the referenced node, so the more nodes with unique identifier, the larger this list or hash map, which consume greater amount of memory resource. Additionally, there could be performance and data integrity issues when the user agents and the server have to coordinate and maintain all these unique identifiers in sync with each other.

Alternatively, one can use path expression to represent the address of a node and bypasses some of problems with using unique identifiers, however, this approach has its own problem because it is usually expressed as a single absolute path from the root node, and because if the underlying tree is changed from the time the path is generated to the time this path is applied on the tree to retrieve the node, then the retrieved node may not match to the one that is addressed. The reason is if the path contains relative array index, and if the array of child nodes that these relative indexes reference changes because a new child node is added or an existing child node is removed in the array, then the path becomes incorrect. For example, a simple path expression that addresses sentence #3 in paragraph #9 in chapter 2 of a book may look like this a. /book/chapter[2]/paragraph[9]/sentence[3]

and it remains valid as long as the positions of the chapter, paragraph, and sentence reference by the relative indexes 2, 9 and 3, respectively, remain unchanged in the tree. However, this simple path expression becomes incorrect when the "book" undergoes structure changes like: a new chapter is added before chapter 2, or paragraph #8 is removed from chapter 2, or a new sentence is inserted as sentence #2 in paragraph #9 in chapter 2. This simple path expression becomes incorrect because it no longer is pointing to the original sentence #3, and when this path expression is applied to the changed tree, it will retrieve a sentence #3 that is incorrect comparing to what it was suppose retrieve before the tree change. This problem is more severe for highly nested multi-level trees, and the path expression becomes more sensitive to minor changes to the structure of the tree.

XPath and XPointer are open standard specifications that define the syntax and the path expression to navigate and select nodes or node-sets in an XML document. For a given node, there are many path expressions that can be used to represent the address of that node. These specifications do not define which one of them makes a good address for a node. In most cases, the fully qualified name of the node is used to address it. The specification also does not take into account the schema of the XML document or the use history and pattern of the XML document that can be used to produce optimal addressing for a given node.

Known methods deal with arbitrarily large SGML/HTML/XML documents, and formatting or subsetting them effectively without serial processing. This is a key enabler for dealing with non-trivial sized documents, regardless of medium. Other known systems function as batch formatters. In those batch formatters, seeing page N takes time at least proportional to N. Other widely used known techniques use two ways to identify a node: by its Element ID (EID), which is created for each node as it is being instantiated in memory; and by its fully qualified name.

Dom4j is an open source program that is used to navigate and query a data tree. One of the method on a Element node is getUniquePath( ), which returns a unique path from the root node to the Element node in question. This unique path is same as the fully qualified name and always starts from the root node.

BRIEF SUMMARY OF THE INVENTION

A method and system for addressing a node in a tree-like data structure are provided. The method in one aspect comprises at least receiving a reference to a node in a tree-like data structure. The tree-like data structure for instance has at least a plurality of nodes. One or more nodes in the tree-like data structure may be assigned as marker node. The method also includes at least identifying a marker node near the node, the identified marker node being a node other than the root node of the tree-like data structure. The method further includes at least determining a relative path expression from the marker node to the node.

The reference to a node in one aspect may be a fully qualified name of the node. In another aspect, the reference to a node may be a pointer to the node. Yet in another aspect, the step of identifying may include identifying a marker node near the node using a marker node list. In another aspect, the step of identifying may include scanning a tree-like data structure containing the node to identify a marker node near the node. The scanning a tree-like data structure may include scanning one or more sibling, ancestor, or descendent nodes of the node, or combination thereof.

Still yet, the method may further include assigning a plurality of marker nodes in a tree-like data structure based on a predetermined criterion. The step of identifying may also include identifying a marker node near the node based on the predetermined criterion.

Additionally in one aspect, the method may include assigning a plurality of marker nodes in a tree-like data structure and generating a marker node list including at least the plurality of marker nodes. The method may also include encoding a plurality of marker nodes in a tree-like data structure with marker information that point to nearby marker nodes for triangulation.

In another aspect, a method of addressing a node in a tree-like data structure may comprise at least receiving a reference to a node, identifying a plurality of marker nodes near the node, the plurality of marker nodes being in independent path from one another, determining a plurality of path expressions from the plurality of marker nodes to the node, and resolving the plurality of path expressions to a single path expression. The step of resolving in one aspect may include determining whether a path expression in the plurality of path expressions is a marker node, and if the path expression is a marker node, returning the path expression as the single path expression. The step of resolving may also include returning as the single path expression a path expression in the plurality of path expressions that has the highest number of matches.

A system for addressing a node in a tree-like data structure in one aspect comprises at least means for receiving a reference to a node in a tree-like data structure having at least a plurality of nodes of which one or more nodes being assigned as marker node, means for identifying a marker node near the node, the identified marker node being a node other than a root node of the tree-like data structure, and means for determining a relative path expression from the marker node to the node. In one aspect, one or more marker nodes may be embedded within the tree-like data structure. In another aspect, a link reference to its marker node list may be associated with the tree-like data structure. Yet in another aspect, a link reference to its marker node list may be embedded within the tree-like data structure. Yet in another aspect, a marker node list may be embedded within the tree-like data structure.

Further features as well as the structure and operation of various embodiments are described in detail below with reference to the accompanying drawings. In the drawings, like reference numbers indicate identical or functionally similar elements.

DETAILED DESCRIPTION

The present disclosure describes a technique that uses multi-path expression to triangulate the address of node in a tree-like data structure, which is similar in concept with the Global Positioning System (GPS) that pinpoint the coordinate of a location on the surface of Earth using signals from GPS satellites. This multi-path expression is processed by an address lookup function that pinpoints the correct node in the tree, and detects and recovers from error condition when the underlying tree data structure has undergone changes. In an exemplary embodiment, the individual path in the multi-path expression is independent from each other. For example, each path is anchored by a marker node that is accessed independently from other marker nodes. In cases where trees or their schema do not have sufficient marker nodes needed to generate independent multi-path expression for all the nodes in the tree, the method and system of the present disclosure in one embodiment efficiently and sparsely assign unique identifiers to a subset of nodes in the tree data structure and to use these marker nodes to anchor the triangulation addressing technique. In another embodiment, the present disclosure also provides an optimization where the list of marker nodes is created on-demand by a server and sent to the client user agents.

The method and system of the present disclosure in one embodiment are able to use the redundancy built-in the multi-path expression to detect and correct potential problem with addressing when the underlying tree data structure changes. The method and system is also able to reduce the need to assign unique identifier to all nodes of interest, instead, only a small fraction of nodes may be assigned. The knowledge used to create the assigning algorithm may be also used to create a corresponding address lookup function to create independent path expressions to the marker nodes. In this embodiment, the number of potentially updated nodes is a small fraction of all the nodes and lazy loading or partial load where only a subset of nodes are loaded into the memory is possible.

The method and system of the present disclosure in an exemplary embodiment use marker nodes to anchor the relative address or relative path expression for a node and an address lookup function that knows about the distribution pattern of these marker nodes. The method and system of the present disclosure facilitate propagation of data modification of a node in a tree type data structure that has been distributed to user agents from a central server. The method and system in one embodiment address a node in a tree type data structure using the relative path expression to a nearby marker node. The relative expression in one embodiment is created by an address lookup function that uses an algorithm based on the schema of the data tree and/or and knowledge of the marker node location pattern. A marker node is a node that is addressable with a unique identifier such as an attribute or a node name or a combination of them. The address lookup function uses an algorithm that is created based on the knowledge of the distribution pattern of the marker nodes in the data tree. In one embodiment, this algorithm may use an index of marker node paths to search the relevant marker nodes near the node in question. In another embodiment, this algorithm may scan the sibling and ancestor nodes to find nearby marker nodes starting from the node in question.

In conjunction with the address lookup function, a marker assignment function is used in one embodiment, for example, to create a distribution of marker nodes in the tree whose pattern is known to the address lookup function, for instance, for the address lookup function to efficiently find them for a given node. The marker assignment algorithm depends on the schema of the tree data structure or the usage history and pattern of the data tree or both. For example, an algorithm may assign or create greater number of marker nodes around the region of data tree that is being modified at a higher rate and assign lesser number of marker nodes to regions that have fewer activities.

In one embodiment, the method and system of the present disclosure also may use multi-path expression to reliably triangulate the location of a node in a tree type data structure. An address lookup function is used to generate this multi-path expression for a given node in the tree in one embodiment. This multi-path expression is composed of two or more relative paths to the node being addressed, each anchored by a different nearby marker node in the tree.

In support of multi-path expression, a marker node in one embodiment contains information on the whereabouts of other marker nodes nearby, so the address lookup function can quickly locate them after it finds the first one. In one embodiment, an address resolver service is used to process this multi-path express to locate the node in the data tree. The resolver detects and corrects problems in pinpointing the correct node of interest in the tree even if the tree has undergone changes, for example, when the nodes around the node of interest have been added or deleted.

In another embodiment of the present disclosure, an optimization technique provides the ability, for example, of user agent, to request the marker nodes around a region of a data tree from the marker assignment service on demand. The marker nodes in one embodiment are dynamically added to the data tree as they are needed. In this way, the data tree does not have to be first tagged with marker nodes before the user agent retrieves it.

A tree type data structure is generally expressed as a tree of nodes, where the tree starts from a single root node, and each node of the tree has a single parent node, and each node may have a name and holds zero or more name-value attributes and have zero or more child nodes. To support user interaction, some nodes have event listeners attached to them, which enable these nodes to capture events such as user clicks and keyboard typing and the like. When an event occurs, the event listener that captures the event needs to determine the location, which is the address, of the node in the tree that the event originated, and then take appropriate responding action. In general, this address is statically assigned by the program that creates the tree data structure. In the web browser example, the browser sets the addresses of the nodes that are able to generate the events by using the information like the 'ID', 'class' or the 'hdref' attributes found in the source HTML document. The method and system of the present disclosure in an exemplary embodiment addresses a node using one or more relative path to one or more marker nodes.

Figure 1:
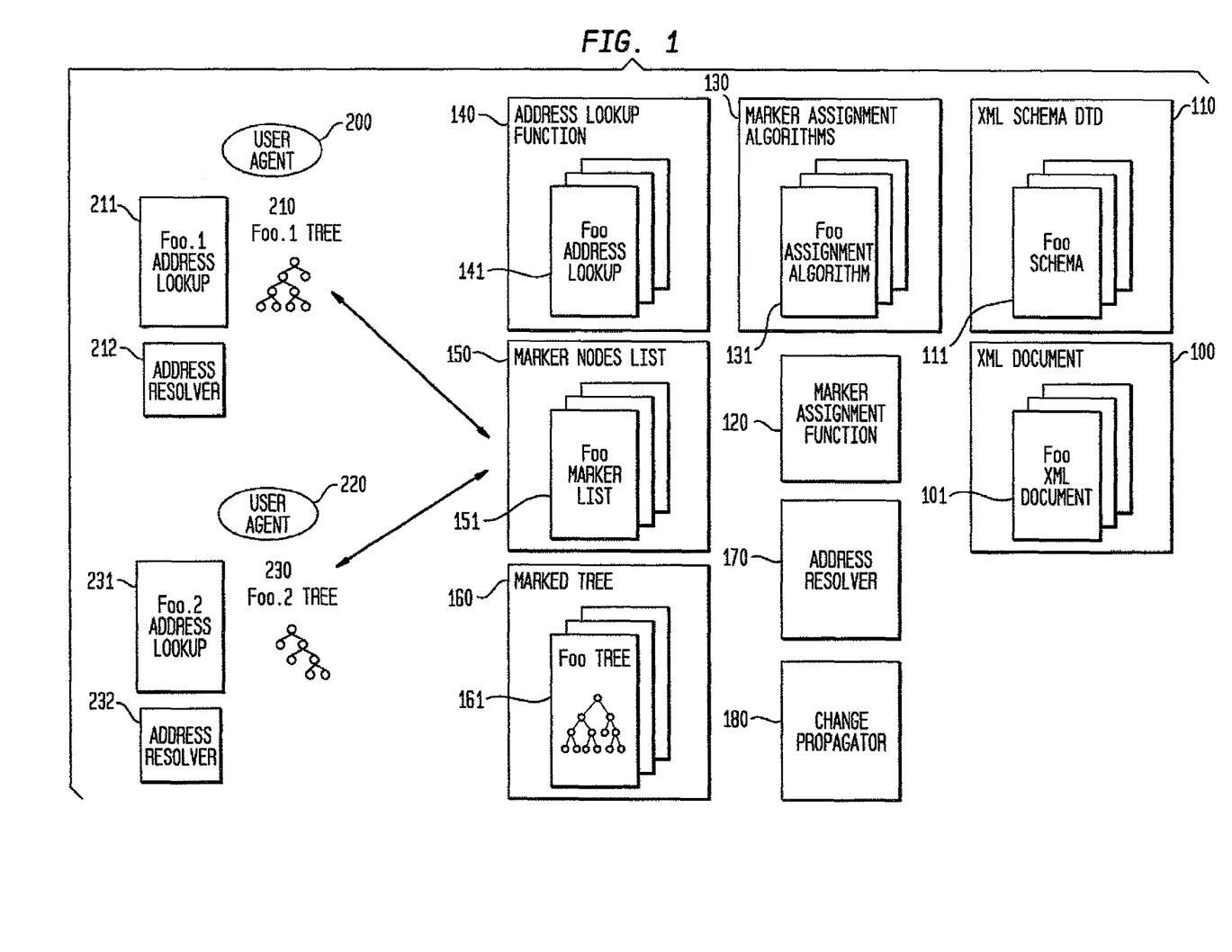
FIG. 1 is a high-level system diagram illustrating a system of the present disclosure in one embodiment.

FIG. 1 is a high level system diagram illustrating the method and system of the present disclosure in one embodiment. A system may have a collection (100) of instance XML document, one of which is foo (101). These instant XML documents are typed by their schema or DTD (110), including the foo schema (111) for the foo document. It is not a requirement that the XML document has a schema or DTD. The XML document is either a static document that was uploaded onto the server by one of the user agent (200) or a dynamic one created on-demand by the server from back-end data sources. Each instant XML document is visible to the user agents connected to this server and the user agents can access any XML document by its name, for example, by its URL.

A marker assignment service (120) takes an XML document and generates a list of marker nodes (140). This service uses an assignment algorithm (130) to generate the list of marker nodes for a given XML document. In one embodiment, each instant XML document may have its own assignment algorithm. In another embodiment, one or more assignment algorithm is created for each schema type. In one embodiment, a programmer who knows about the structure of the instant XML document and its use history and pattern may manually create this assignment algorithm. In another embodiment, this algorithm may be automatically created by a program that parses its schema or DTD, and takes document usage pattern as input parameters.

The marker node lists (150) are used to create the marker nodes in the data trees (160). It may be also kept separately for retrieval by user agents (200, 220). The knowledge used to create the assignment algorithm (130) for a given XML document is also used to create its corresponding address lookup program (140). The address lookup program is used to create the single or multi-path expression for a given node. Its input is a reference to the node, for instance as an in-memory object reference or as a fully qualified name.

When a user agent requests the "foo" XML document, a marked copy (161) of the document is returned in one embodiment. In one embodiment, this marked copy is the same as the original document, but with the addition of marker nodes embedded within it or a link reference to its marker node list (151) that user agent can dereference and retrieve separately. This marked copy also has the address lookup function embedded within it or a link reference to it (141) for later retrieval. The user agent uses the address look up function to generate the address of a node in the tree that has changed or was deleted. For a new node, the address of the parent or the sibling node next to the new node is used as the reference node for the operation in one embodiment. This node address is sent back to address resolver (170) along with the new or changed content. The address resolver processes the relative paths, for instance, by navigating the data tree (161) or using the marker node list (151), or combination thereof, and retrieves the node in question from the data tree (161), and executes the operation on the node. A change propagator (180) is used to send this change, which includes the operation, node address and content, to all other user agents (220) that are interested in this data tree. When user agent (220) receives this change propagation from the change propagator (180), it uses its address resolver (232) to locate the node in its data tree (230) and execute the change operation on the node.

In one embodiment, the method and system may be designed to accommodate user agents wanting to view different parts of the data tree (210, 230). In one embodiment, the method and system of the present disclosure also provides capability of handling one or more occurrences of cases such as addressing error caused by changes to the underlying data tree structure, removal of one or more marker nodes, insertion of a new sub-tree that needs marker nodes assigned, race conditions between changes from the change propagator (180) and changes initiated by the user agent.

Marker Node

A marker node is a node that is addressable with a unique identifier, like an attribute or a node name or a combination of them. In XML, the value of an "ID" attribute in an element node is defined to be unique within the scope of a document, and W3DOM API supports a method call getElementById( ) that retrieves the element node using the value of the "ID" attribute. Element nodes with this "ID" attribute make ideal marker nodes. However, other attribute or a combination of attributes grouped together can also be used to define a unique identifier and used for marking purposes. In addition, a node with a unique node name that occurs at most once in the tree may also be used as a marker node.

Once a marker node is assigned or created, its identifier is not expected to change. When a marker node is removed, it is only "soft" deleted until all user agents have been notified of this change. This "soft" deleted marker node is needed for recovery if an address references it shortly after its deletion. There are various ways to implement "soft" deletes that are beyond the scope of this invention.

Marker Node List

A marker node list is a list of marker nodes, represented by their fully qualified name, and their corresponding unique identifiers defined earlier. A fully qualified name is a path expression from the root node to a child node, e.g., "/book/chapter[2]". A marker node list at a minimal is a list of nodes with their "ID" attributes defined and nodes whose name occur only once in the tree. Instead of using an existing node in the tree as a marker node, it can also be created from a new node.

In one embodiment, a marker node list may be embedded within the marked document (161) and sent to a user agent. In another embodiment, a reference link may be inserted in the marked document that a user agent dereferences and retrieves separately.

Marker Assignment Algorithm and Distribution Pattern

Some data trees or their schema do not have sufficient built-in marker nodes to generate independent multi-path expression for all the nodes in the tree. A marker node assignment function in one embodiment is used to create sufficient marker nodes to effectively address all the nodes in the data tree. They are analogous to anchors for the relative path expression. In one embodiment, marker node assignment function (120) uses marker assignment algorithms (130) to perform its function. A simple assignment algorithm is to mark the first and last nodes and every $N^{th}$ node in between of an array of child nodes, so that any child node is at most N/2 siblings away from the nearest marker node. The closer the spacing between the marker nodes, the more accurate and reliable the address will be. The accuracy of relative path addressing depends on any change such as node creation or deletion that may have occurred between the node in question and the marker node from the time the address is generated to the time the address is resolved. In one embodiment, a data tree may have about 50% of its nodes assigned as marker nodes, that is, every other node in the tree is a marker node. Any number more than this may be unnecessary but possible. Fewer number of marker node can be assigned.

Given an array of sibling nodes 1 to N, and assuming the probability of a node insertion or deletion into this array is a constant 1/N, the probability of a node affected by a change is proportional to the relative position of the node to the first node. In other words, nodes located towards the end of the array are highly susceptible to changes that occur before them. The reason is because it is a common practice to address the nodes using array indexes, and a node insertion at the beginning of the array causes all array indexes after the new node to increase by one, and a node deletion causes the array indexes to decrease by one. One solution to alleviate this problem is to create marker nodes between the first and last nodes in the array. The marker nodes act like isolation barriers that dampen the ripple of indexes changes to the array of nodes. In this scenario, more marker nodes may be needed to keep track and maintain.

Besides the spacing between the marker nodes, the name of the unique identifier can be encoded to give hints as to the location of other marker node in the DOM tree, e.g., 'body_h1_h2_p4_L3_R9' which could mean "/body/h1/h2/p[4]' and another marker can be found that is within 3 siblings to the left or 9 siblings to the right of this one. Not all parts of a data tree undergo changes equally over a period of time, for instance, some sub-trees change more frequent than others. Under this use pattern, it makes sense to assign more marker nodes to those sub-trees that are changed more frequently to improve addressing accuracy and to reduce addressing error caused by changing data tree, and assign fewer marker nodes to those sub-trees that change less frequently.

Address Lookup Function

In one embodiment, the knowledge used to create the marker node assignment algorithm (131) is also used to create a corresponding address lookup program (141). The address lookup program creates the single or multi-path expression for a given node. Its input is a reference to the node, for example, as an in-memory object reference or as a fully qualified name. This address lookup program takes advantage of its knowledge of the assignment algorithm, for example, the encoding scheme of the unique identifier name and/or the placement pattern of the marker nodes, to determine its whereabouts in the DOM tree.

Figure 2:
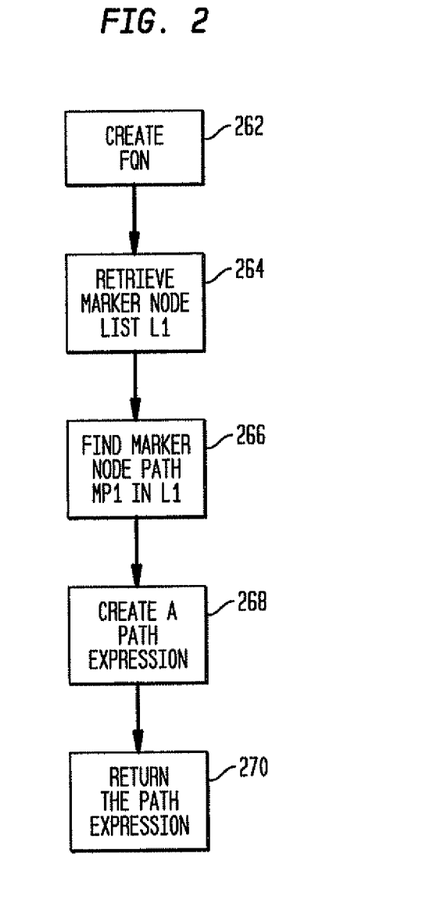
FIG. 2 is a flow diagram illustrating an example of an address lookup algorithm in one embodiment of the present disclosure.

Two examples of address lookup algorithms are described below: one uses the marker node list and the second one scans the data tree for marker nodes. Other lookup algorithms may be used. FIG. 2 is a flow diagram illustrating an example of an address lookup algorithm in one embodiment of the present disclosure. This lookup algorithm finds a relative path from a node to a nearby marker node given the fully qualified name (FQN) of the node and the marker node list. At 262, given a node X, the algorithm creates a fully qualified name (FQN) for it by finding its relative index within its parent, and walking up the tree and doing the same for its ancestors. An example of a fully qualified name (FQN) generated for node X may be "/book/chapter[2]/h2[5]/p[17]". The array index notation "[N]" represents the $N^{th}$ child element. This example FQN points to the $17^{th}$ paragraph in the $5^{th}$ sub-header located in $2^{nd}$ chapter of a book. At 264, the method retrieves the sorted and indexed marker node list L1 associated with this data tree that contains node X. At 266, the algorithm finds in the marker node list L1 the marker node path MP1 that has the shortest path difference to the FQNx, that is, to node X. At 268, it creates a path expression using the identifier associated with the marker node MP1 and the path difference to the FQNx. If MP1 path is "/book/chapter[2]/h2[5]/p[1]" and its identifier is "ch2_h2.5_p.1", then the relative path expression for node X is "/[@id='ch2_h2.5_p.1'][16]". This relative path expression describes a way to retrieve node X by starting from a node whose unique "id" is "ch2_h2.5_p.1", then traverse 16 paragraph nodes, which is the $17^{th}$ paragraph, which is the node X that is being addressed. At 270, the path expression is returned.

Figure 3:
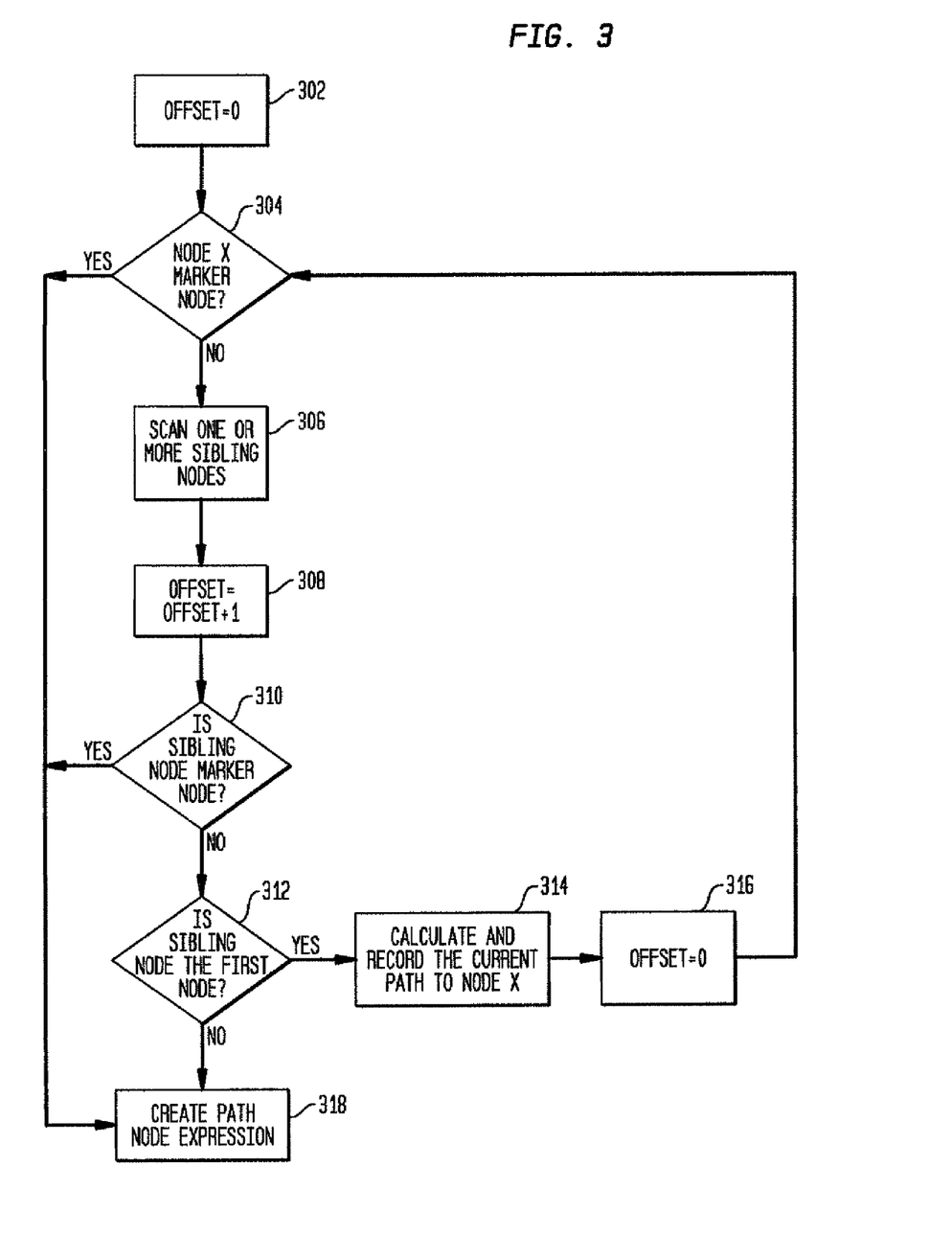
FIG. 3 is a flow diagram illustrating another example of an address lookup algorithm in one embodiment of the present disclosure.

FIG. 3 is a flow diagram illustrating another example of an address lookup algorithm in one embodiment of the present disclosure. In one or more scenarios where a marker node is embedded in a data tree, the tree is scanned to find the marker node. In one embodiment, the algorithm uses a scan path that traverses the left siblings and up to the parent and repeats the process. Similar algorithm is used to traverse the right siblings. At 302, offset is set to 0. When a program is traversing an array of child nodes in a tree, the program does not know which position, or array index, within the array a child node resides, because this index information is not stored in the child node itself. By keeping a variable like 'offset' a program can derive the array index of a child node within the array. For example, when the program traverses along the left sibling route, sooner or later, it will encounter the first child in the array and can go no further to the left. The offset variable tells the program the offset index of the node X relative to the first child node, which also happens to equal to the array index. For instance, if a child node is at the $7^{th}$ position within the array of child node, then it is the $6^{th}$ child node to the right of the $1^{st}$ child node. In this example, the first child node has array index of 1.

At 304, given a node X, it is determined whether the node is a marker node. If the node is a marker node, the method proceeds to 318. At 306, its siblings are scanned, for instance, starting from the sibling to its left. At 308, offset is incremented. At 310, it is determined whether the sibling node is a marker node. If the sibling node is a marker node, the method proceeds to 318. At 312, it is determined whether the sibling node is the first node. If the sibling node is the first node, then at 314, the current path to node X is calculated and recorded. In an array of child nodes that share the same parent node, these children nodes are considered to be siblings. Except for the first and last child node in the array, each child node has a left or right sibling, and in this traversal example, the left sibling is closer to the first child node, and a right sibling is closer to the last child node. Also in this traversal example, the first child node has no left sibling, and the last child node has no right sibling. In one embodiment, when a program traverses an array of child nodes starting from a given child node, it scans left sibling nodes until it hits the first child node. In one embodiment, the variable 'offset' is used to keep track of the number of the child nodes traversed from a given node to the marker node or first node. If upon hitting the first child node, no marker node is found, then the program traverses up to the parent node, but before it does so, a partial path expression is created to remember the traversal. Consider "/book/chapter[2]/h2[5]/p[17]" as an example. The program starts with a paragraph node in an array of paragraph nodes, and it does not know its relative path location within the data tree of "book". Assume for this example that there is a marker node located at "/book/chapter[2]/h2[1]" and none in the paragraph nodes within the "h2[5]" node. To find this marker node, the program scans left of current paragraph node, it will traverse 16 paragraph nodes before it encounters the first paragraph node, since no marker node is found among the paragraph nodes, and the scanning of the left sibling node cannot go on any further, the program has to move up a level to the parent "h2" node. Before it does this, the program records the current relative path, which is relativePath="/"+elementName[offset+1]+relativePath. At the start of the scan, the relativePath="", an empty string. The elementName in this case is "p" for paragraph, and the offset is 16, which produce a result of "/p[17]". Now the program is looking at an "h2" node in an array of "h2" nodes, so the traverse algorithm along the left sibling nodes is repeated with the variable offset reset to 0. This time, the scan will come across a marker node, which is located at the $4^{th}$ left sibling node from starting "h2" node. The relativePath is calculated again, and this time it produces something like "/[@id='h2_1'][4]/p[17]", which uses marker node id 'h2_1' as the starting point. In one embodiment, the marker node id is set by an external agent, and not derived by the address lookup program that scans for marker nodes.

Thus, at 316, offset is reset to 0, and the algorithm traverses to its parent node and proceeds to 304. At 318, a path expression is created using the identifier associated with the marker node and the path to node X. In one embodiment, an address lookup function may be embedded within the marked document (FIG. 1, 161) and sent to the user agent. In another embodiment, a reference link may be inserted in the marked document, which the user agent dereferences and retrieves separately. The latter approach enables the address lookup function to be shared and used by different instances of XML documents.

Multi-Path Address Lookup

In one embodiment of the present disclosure, a multi-path expression is used to represent the address of a node, for instance, to improve the accuracy of the addressing and to detect and correct addressing error caused by changing data tree. In this embodiment, instead of relying on a single relative path expression to address a node, two or more relative paths are used, with each anchored by a different marker node. Similar to the error correction code (ECC) used to correct hardware memory errors, with two relative paths, the system can at least detect error condition when the two relative paths disagree and resolve to different nodes, but the system may or may not be able to determine which one is the correct one. Additional information can be encoded in the identifier to help determine the correct relative path. Such information may include but is not limited to the relative index of the marker node in the array of nodes. With three relative paths, the system can detect and correct one incorrect relative path.

With three relative paths, three marker nodes are needed. These marker nodes are chosen with a criterion that their paths do not cross each other, that they are independent from each other. This criterion prevents a single node insertion or deletion to simultaneously corrupt two paths. Therefore, in one embodiment, three marker nodes are chosen as follows:

A sibling node to the left of the node in question, or an ancestor node
A sibling node to the right of the node in question
A descendant node In one embodiment, this multi-path expression node address is created by one user agent of the data tree $T_1$ (FIG. 1, 210) and given to a second user agent to process and retrieve the node from a second data tree $T_2$ (FIG. 1, 161). The two data trees are related. For instance, they could be the same, or a copy of each other, or one tree is a sub-tree of the other.

Address Resolver

In one embodiment, an address resolver parses the relative paths, processes them and returns the right node that is being addressed. The processing steps of the three relative paths. $\{P_1, P_2, P_3\}$ for data tree T is described below, a. $Node_1 = eval(P_1, T)$
b. $Node_2 = eval(P_2, T)$
c. $Node_3 = eval(P_3, T)$
d. If ($Node_1$ is a marker node) then $Node = Node_1$
e. else if ($Node_1$ equals $Node_2$) then $Node = Node_1$
f. else if ($Node_1$ equals $Node_3$) then $Node = Node_1$
g. else if ($Node_2$ equals $Node_3$) then $Node = Node_2$
h. else raise error where the eval( ) function evaluates a single relative path expression and retrieves the node in the tree addressed by it. If the first path $P_1$ evaluates to a marker node, this node is returned because the marker node does not change. Otherwise, the process uses a majority wins algorithm to determine the correct node and returns it. If none of the three nodes matches, then an error condition is raised. Additional checking may be performed for detecting error conditions.

The resolver in one embodiment may have an additional responsibility such as correcting any relative path that is incorrect due to changes to the data tree structure, so that it can be reused by the change propagator (FIG. 1, 180) to send to other user agents.

Change Propagator

Change Propagator (FIG. 1, 180) in one embodiment distributes changes to the data tree to user agents (FIG. 1, 200, 220). If the change is a new sub-tree being added to the data tree, then this sub-tree is first processed by the marker assignment function (FIG. 1, 120) to create a marker nodes list for this sub-tree. This marker nodes list is added to the marker nodes list of the whole data tree. The marker nodes may be assigned to the nodes in the sub-tree, for example, if needed.

The Change Propagator also may distribute changes to the marker nodes to other user agents. In one embodiment, marker node changes are sent as updates to the marker node list. If the marker nodes are embedded within the data tree, then they may be sent as part of normal change updates to the data tree.

Figure 4:
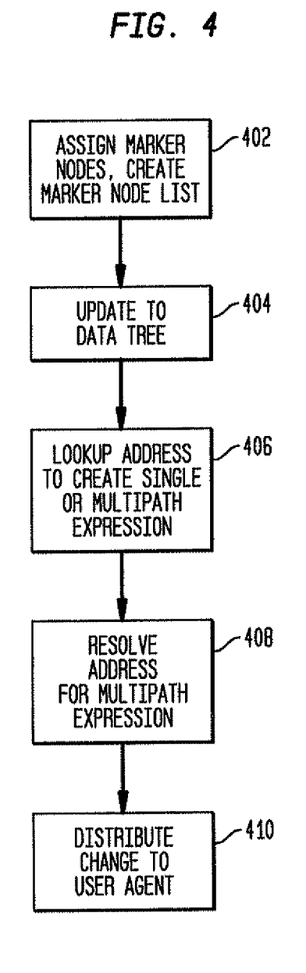
FIG. 4 is a diagram illustrating a high-level flow of a use case in a method of present disclosure in one embodiment.

FIG. 4 is a diagram illustrating a high-level flow of a use case in one embodiment of the present disclosure. At 402, marker nodes are assigned to a plurality of nodes in a data tree. A distribution of marker nodes may be created, for example, using knowledge of data tree data structure and/or usage history pattern of the data tree. In one embodiment, a marker node list may also be generated. At 404, a node of the data tree is changed. For instance, a user agent having a copy of the data tree may update the data tree and send it to the central server, which the central server may then need to distribute to other user agents accessing or using the data tree. At 406, an identifier according to the method of the present disclosure is generated. For instance, an address lookup function may use the knowledge of the data tree's data structure and marker node distribution to locate and create a relative path expression from a selected marker node in the data tree. In one embodiment, the identifier may be a single path expression. In another embodiment, the identifier may be a multi-path expression. At 408, if multi-path expression, they are resolved, for instance, by an address resolver. At 410, the change to the node is distributed using the path expression.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A method of addressing a node in a tree-like data structure, comprising:
receiving a reference to a given node in a tree-like data structure having at least a plurality of nodes in which one or more nodes are assigned as one or more marker nodes, wherein the nodes in the tree-like data structure do not all have assigned unique identifiers, wherein a fraction of the nodes in the tree-like data structure are assigned as marker nodes by a marker assignment algorithm based on usage history, pattern of the tree-like data structure, and parsing of the schema of the tree-like data structure, and wherein one or more of the marker nodes have a unique name encoded with an indication that addresses another assigned marker node's location in the tree-like data structure, wherein the indication contains information on the whereabouts of said another assigned marker node,
wherein the marker assignment algorithm of nodes further comprises distribution of marker nodes in said tree-like data structure;
identifying a marker node near the given node, the identified marker node being a node other than a root node of the tree-like data structure;
determining a relative path expression from the marker node to the given node;
creating a path expression using the identified marker node's unique name and the relative path expression, the path expression addressing the given node;
using the identified marker node's unique name to find said another assigned marker node in the tree-like data structure and creating another path expression to the given node based on said another assigned marker node;

propagating data modifications of nodes in said tree-like data structure to a plurality of user agents.

2. The method of claim 1, wherein the reference to a given node includes a fully qualified name of the node.

3. The method of claim 1, wherein the reference to a given node includes a pointer to the node.

4. The method of claim 1, wherein the step of identifying includes identifying a marker node near the given node using a marker node list.

5. The method of claim 1, wherein the step of identifying includes scanning a tree-like data structure containing the given node to identify a marker node near the node.

6. The method of claim 5, wherein the scanning a tree-like data structure includes scanning one or more sibling, ancestor, or descendent nodes of the given node, or combination thereof.

7. The method of claim 1, further including:
assigning a plurality of marker nodes in a tree-like data structure based on a predetermined criterion.

8. The method of claim 7, wherein the step of identifying further includes:
identifying a marker node near the given node based on the predetermined criterion.

9. The method of claim 1, further including:
assigning a plurality of marker nodes in a tree-like data structure; and
generating a marker node list including at least the plurality of marker nodes.

10. The method of claim 1, further including:
encoding a plurality of marker nodes in a tree-like data structure with marker information that points to nearby marker nodes for triangulation.

11. A method of addressing a node in a tree-like data structure, comprising:
receiving a reference to a node in a first tree-like data structure; identifying a plurality of marker nodes near the node, all of the plurality of marker nodes being in independent path to the node from one another so that their paths to the node do not cross each other until at the node, wherein the nodes in the first tree-like data structure do not all have assigned unique identifiers, wherein a fraction of the nodes in the first tree-like data structure are assigned as the marker nodes by a marker assignment algorithm based on usage history, pattern of the first tree-like data structure, and parsing of the schema of the tree-like data structure, and wherein one or more of the marker nodes have a unique name encoded with an indication of another assigned marker node's location in the first tree-like data structure,
wherein the marker assignment algorithm of nodes further comprises distribution of marker nodes in said tree-like data structure;
determining a plurality of path expressions from the plurality of marker nodes to the node; and
resolving the plurality of path expressions to a node on a second tree-like data structure,
each of the plurality of path expressions anchored by a different one of the plurality of marker nodes, and the plurality of path expressions created by one user agent of the first tree-like data structure and given to another user agent to process and retrieve the node from the second tree-like data structure;
propagating data modifications of nodes in said tree-like data structure to a plurality of user agents.

12. The method of claim 11, wherein the step of resolving includes:
determining whether a first selected path expression in the plurality of path expressions addresses a marker node on the second tree-like data structure, and if the first selected path expression addresses a marker node, returning the marker node.

13. The method of claim 11, wherein the step of identifying includes identifying a plurality of marker nodes near the node using a marker node list.

14. The method of claim 11, wherein the step of identifying includes scanning a data tree containing the node to identify a plurality of marker nodes near the node.

15. The method of claim 11, further including:
assigning a plurality of marker nodes in a data tree based on a predetermined criterion.

16. The method of claim 15, wherein the step of identifying further includes:
identifying a plurality of marker nodes near the node based on the predetermined criterion.

17. The method of claim 11, further including: assigning a plurality of marker nodes in a data tree; and
encoding the plurality of marker nodes with marker information that points to nearby marker nodes for triangulation.

18. A system for addressing a node in a tree-like data structure, comprising:
means for receiving a reference to a given node in a tree-like data structure having at least a plurality of nodes in which one or more nodes are assigned as one or more marker nodes, wherein the nodes in the tree-like data structure do not all have assigned unique identifiers, wherein a fraction of the nodes in the tree-like data structure are assigned as marker nodes by a marker assignment algorithm based on usage history, pattern of the tree-like data structure, and parsing of the schema of the tree-like data structure, and wherein one or more of the marker nodes have a unique name encoded with an indication that addresses another assigned marker node's location in the tree-like data structure, wherein the indication contains information on the whereabouts of said another assigned marker node,
wherein the marker assignment algorithm of nodes further comprises distribution of marker nodes in said tree-like data structure;
means for identifying a marker node near the given node, the identified marker node being a node other than a root node of the tree-like data structure; and
means for determining a relative path expression from the marker node to the given node, creating a path expression using the identified marker node's unique name and the relative path expression, the path expression for addressing the given node, and using the identified marker node's unique name to find another marker node in the tree-like data structure for creating another path expression to the given node;
means for propagating data modifications of nodes in said tree-like data structure to a plurality of user agents.

19. A program storage device readable by machine, tangibly embodying a program of instructions executable by the machine to perform a method of addressing a node in a tree-like data structure, comprising:
receiving a reference to a given node in a tree-like data structure having at least a plurality of nodes in which one or more nodes are assigned as one or more marker nodes, wherein the nodes in the tree-like data structure do not all have assigned unique identifiers, wherein a fraction of the nodes in the tree-like data structure are assigned as marker nodes by a marker assignment algorithm based on usage history, pattern of the tree-like data structure, and parsing of the schema of the tree-like data structure, and wherein one or more of the marker nodes have a unique name encoded with an indication that addresses another assigned marker node's location in the tree-like data structure, wherein the indication contains information on the whereabouts of said another assigned marker node, wherein the marker assignment algorithm of nodes further comprises distribution of marker nodes in said tree-like data structure;

identifying a marker node near the given node, the identified marker node being a node other than a root node of the tree-like data structure;

determining a relative path expression from the marker node to the node;

creating a path expression using the identified marker node's unique name and the relative path expression, the path expression addressing the given node; and using the identified marker node's unique name to find said another assigned marker node in the tree-like data structure and creating another path expression to the given node based on said another assigned marker node;

propagating data modifications of nodes in said tree-like data structure to a plurality of user agents.

20. The method of claim 11, wherein the step of resolving includes:

evaluating each of the plurality of path expressions to determine one or more nodes addressed by the plurality of path expressions;

in response to the plurality of path expressions being evaluated to a same node, returning said same node;

in response to the plurality of path expressions being evaluated to at least two different nodes, returning a node that is addressed by a majority of the plurality of path expressions.

21. The method of claim 1, wherein the determining a relative path expression from the marker node to the given node includes creating a path expression using an identifier of the identified marker node and a path from the marker node to the given node, the created path expression for use for locating the given node in a second tree-like data structure, the path expression created by one user agent of the tree-like data structure and given to another user agent to process and retrieve the node from the second tree-like data structure.

22. The method of claim 11, wherein the plurality of path expressions includes at least path expressions P1, P2, and P3, and the step of resolving includes at least:

evaluating P1 to first node Node1,
evaluating P2 to second node Node2,
evaluating P3 to third node Node3; and
if Node 1 equals Node 2, returning Node 1,
else if Node1 equals Node 3, returning Node 1,
else if Node2 equals Node 3, returning Node2; and
if none of Node1, Node2, and Node3 match, raising an error condition.

* * * * *